United States Patent
Wang et al.

(10) Patent No.: US 12,000,523 B2
(45) Date of Patent: Jun. 4, 2024

(54) CROSS-LINKED POLYETHYLENE TYPE A (PEX-A) PIPE

(71) Applicants: RIFENG ENTERPRISE GROUP CO., LTD., Guangdong (CN); RIFENG ENTERPRISE (FOSHAN) CO., LTD., Guangdong (CN); RIFENG TECHNOLOGY CO., LTD., Guangdong (CN)

(72) Inventors: Lei Wang, Guangdong (CN); Guozhi Xu, Guangdong (CN); Zhiqiang Zheng, Guangdong (CN)

(73) Assignees: RIFENG ENTERPRISE GROUP CO., LTD., Foshan (CN); RIFENG ENTERPRISE (FOSHAN) CO., LTD., Foshan (CN); RIFENG TECHNOLOGY CO., LTD., Foshan (CN)

( * ) Notice: Subject to any disclaimer, the term of this patent is extended or adjusted under 35 U.S.C. 154(b) by 218 days.

(21) Appl. No.: 17/465,799

(22) Filed: Sep. 2, 2021

(65) Prior Publication Data
US 2022/0065369 A1 Mar. 3, 2022

(30) Foreign Application Priority Data
Sep. 2, 2020 (CN) .......................... 202021896988.1

(51) Int. Cl.
*F16L 9/12* (2006.01)
*C08F 10/02* (2006.01)

(52) U.S. Cl.
CPC .............. *F16L 9/121* (2013.01); *C08F 10/02* (2013.01); *F16L 2201/44* (2013.01)

(58) Field of Classification Search
CPC ........ F16L 9/121; F16L 2201/44; C08F 10/02
(Continued)

(56) References Cited

U.S. PATENT DOCUMENTS

2002/0189697 A1* 12/2002 Jarvenkyla ............ B29C 48/395
138/146
2007/0272319 A1* 11/2007 Bittenbender .......... F16L 11/10
138/140
(Continued)

FOREIGN PATENT DOCUMENTS

| CN | 106750986 A | * | 5/2017 |
| CN | 106750986 A | | 5/2017 |

OTHER PUBLICATIONS

Antibacterial property of antibacterial plastics pipes used for building, Building material industry standards of the People's Republic of China, Oct. 20, 2004, pp. 1-4, JC/T 939-2004.
(Continued)

*Primary Examiner* — David R Deal

(57) ABSTRACT

The present disclosure discloses a PEX-A pipe, the pipe wall of the PEX-A pipe includes a PEX-A antibacterial layer, a PEX-A main body layer, and an anti-ultraviolet (UV) layer that are sequentially attached from inside to outside. The anti-UV layer is attached to the outer side of the PEX-A main body layer to enhance the weather resistance and aging resistance and prolong the service life of the pipe. The PEX-A antibacterial layer is attached to the inner side of the PEX-A main body layer to inhibit the growth and reproduction of bacteria in water in the pipe and improve the quality of drinking water.

6 Claims, 2 Drawing Sheets

(58) Field of Classification Search
USPC .......................................................... 138/140
See application file for complete search history.

(56) References Cited

U.S. PATENT DOCUMENTS

| | | | | |
|---|---|---|---|---|
| 2009/0101224 A1* | 4/2009 | Ziu | ..................... | F16L 13/0254 |
| | | | | 285/125.1 |
| 2011/0319837 A1* | 12/2011 | Uehara | ................... | B32B 27/34 |
| | | | | 138/177 |
| 2013/0319570 A1* | 12/2013 | Winterstein | ............ | F16L 9/147 |
| | | | | 138/143 |
| 2017/0030492 A1* | 2/2017 | Zhang | ..................... | F16L 9/147 |

OTHER PUBLICATIONS

Plastics—Methods of exposure to laboratory light sources—Part 3: Fluorescent UV lamps, National Standards of the People's Republic of China, Jul. 8, 2014, pp. 1-12, GB/T 16422.3-2014, corresponding to ISO 4892-3: 2006.

* cited by examiner

CROSS-LINKED POLYETHYLENE TYPE A (PEX-A) PIPE

CROSS-REFERENCES TO RELATED APPLICATIONS

This application claims the priority of Chinese patent application No. 202021896988.1, filed on Sep. 2, 2020, the entire contents of which are incorporated herein by reference.

TECHNICAL FIELD

The present disclosure relates to the technical field of pipes, and in particular to a PEX-A pipe.

BACKGROUND

Cross-linked polyethylene (PEX) is formed by the cross-linking of polyethylene (PE). PE is crosslinked via the peroxide process to form PEX-A. During the crosslinking process, the number of chemical bonds between PE molecules increases greatly, thus the degree of freedom (DOF) of relative displacements of the molecules is greatly reduced. As a result, high-temperature resistance, low-temperature impact strength, wear resistance, environmental stress-crack resistance (ESCR), chemical resistance, tensile strength, and other properties of PEX are greatly improved compared with those of PE.

Although a PEX pipe has a variety of excellent properties, in practical applications, residual chlorine in water, outdoor light, oxygen infiltration, etc. will greatly shorten the service life of a PEX pipe. A research hotspot for plastic pipe companies is how to sustain a pipe's long service life in these unique application conditions. Furthermore, a plastic pipe is less antimicrobial than a metal pipe, and germs are more likely to proliferate in the plastic pipe, lowering water quality. Therefore, this present disclosure aims to invent a new PEX-A pipe, which has enhanced aging resistance and prolonged service life, and can inhibit the growth and reproduction of bacteria in water in the pipe, thereby improving the quality of drinking water.

SUMMARY

To overcome the shortcomings of the prior art, the present disclosure provides a PEX-A pipe, which has increased pressure resistance, aging resistance, and antibacterial activity.

In order to achieve the above objective, the present disclosure adopts the following technical solutions:

A PEX-A pipe is provided, including a PEX-A antibacterial layer, a PEX-A main body layer, and an anti-ultraviolet (UV) layer from inside to outside, wherein the PEX-A antibacterial layer is attached to the PEX-A main body layer, and the PEX-A main body layer is attached to the anti-UV layer. The anti-UV layer is provided as an exterior layer of the PEX-A pipe, which can improve weather resistance and aging resistance while also extending the service life for the pipe. The PEX-A antibacterial layer is arranged as an inner layer of the PEX-A pipe, which can inhibit the growth and reproduction of bacteria in water in the pipe, thereby improving the quality of drinking water.

Further, the PEX-A antibacterial layer, the PEX-A main body layer, and the anti-UV layer may have a thickness ratio of (1-3):(9-11):(0.5-1). The thickness ratio of the layers is adjusted to ensure that the PEX-A pipe has long-lasting and reliable pressure resistance and aging resistance, and the inner layer in direct contact with the water has significant antibacterial activity, thus increasing the quality of drinking water.

Further, materials for the PEX-A antibacterial layer may be PEX-A and an antibacterial agent. The antibacterial agent may be a conventional antibacterial agent, such as an inorganic antibacterial agent and an organic antibacterial agent.

Further, a material for the PEX-A main body layer may be PEX-A.

Further, materials for the anti-UV layer may be PE, an anti-UV additive, and an antioxidant. The antioxidant of the present disclosure may be a hindered phenol antioxidant, a phosphite antioxidant, a thioether antioxidant, or the like.

Compared with the prior art, the present disclosure has the following beneficial effects:

The PEX-A pipe of the present disclosure sequentially includes a PEX-A antibacterial layer, a PEX-A main body layer, and an anti-UV layer from inside to outside. The anti-UV layer can enhance the weather resistance and aging resistance of the pipe, thus extending the service life of the pipe. The PEX-A antibacterial layer can inhibit the growth and reproduction of bacteria in the water within the pipe, thereby improving the quality of drinking water.

DETAILED DESCRIPTION

In order to better illustrate the objectives, technical solutions, and advantages of the present disclosure, the present disclosure will be further described below in conjunction with specific examples. It should be understood by those skilled in the art that the described specific examples are merely used to explain the present disclosure, rather than to limit the present disclosure.

In the examples, unless otherwise specified, the experimental methods used are conventional, and the materials and reagents used are commercially available.

Example 1

Figure 1:
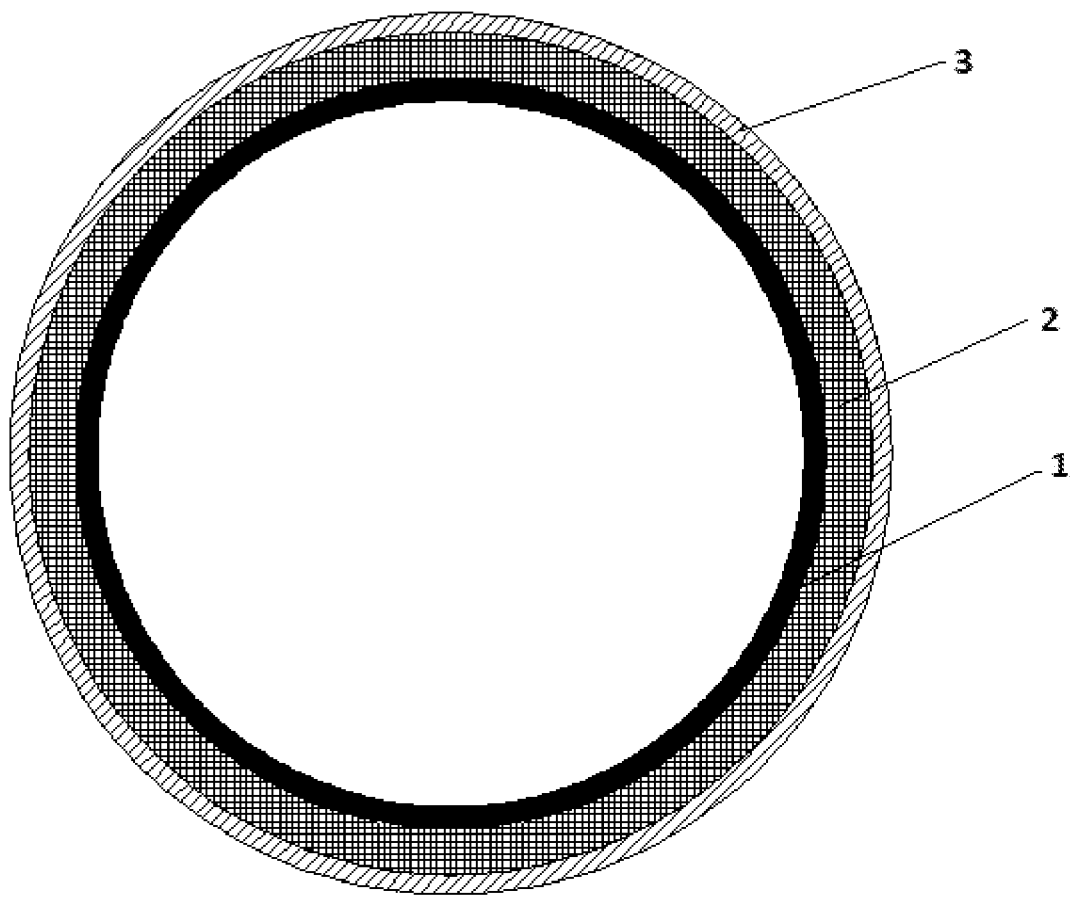
FIG. 1 is a schematic structural diagram for the PEX-A pipes of Examples 1 to 3 and Comparative Example 1, where 1 denotes a PEX-A antibacterial layer, 2 denotes a PEX-A main body layer, and 3 denotes an anti-UV layer.

As shown in FIG. 1, the pipe wall of the PEX-A pipe in this example includes a PEX-A antibacterial layer 1, a PEX-A main body layer 2, and an anti-UV layer 3 sequentially from inside to outside, and the PEX-A antibacterial layer 1, the PEX-A main body layer 2, and the anti-UV layer 3 have a thickness ratio of 1:9:0.5. The PEX-A antibacterial layer 1 is attached to the PEX-A main body layer 2, which is in turn attached to the anti-UV layer 3.

Materials for the PEX-A antibacterial layer 1 are PEX-A and an antibacterial agent; a material for the PEX-A main body layer 2 is PEX-A; and materials for the anti-UV layer 3 are PE, an anti-UV additive, and an antioxidant.

Example 2

As shown in FIG. 1, the pipe wall of the PEX-A pipe in this example includes a PEX-A antibacterial layer 1, a PEX-A main body layer 2, and an anti-UV layer 3 sequentially from inside to outside, and the PEX-A antibacterial layer 1, the PEX-A main body layer 2, and the anti-UV layer 3 have a thickness ratio of 2:10:1. The PEX-A antibacterial layer 1 is attached to the PEX-A main body layer 2, which is in turn attached to the anti-UV layer 3.

Materials for the PEX-A antibacterial layer 1 are PEX-A and an antibacterial agent; a material for the PEX-A main body layer 2 is PEX-A; and materials for the anti-UV layer 3 are PE, an anti-UV additive, and an antioxidant.

Example 3

As shown in FIG. 1, the pipe wall of the PEX-A pipe in this example includes a PEX-A antibacterial layer 1, a PEX-A main body layer 2, and an anti-UV layer 3 sequentially from inside to outside, and the PEX-A antibacterial layer 1, the PEX-A main body layer 2, and the anti-UV layer 3 have a thickness ratio of 3:11:1. The PEX-A antibacterial layer 1 is attached to the PEX-A main body layer 2, which is in turn attached to the anti-UV layer 3.

Materials for the PEX-A antibacterial layer 1 are PEX-A and an antibacterial agent; a material for the PEX-A main body layer 2 is PEX-A; and materials for the anti-UV layer 3 are PE, an anti-UV additive, and an antioxidant.

Comparative Example 1

As shown in FIG. 1, the pipe wall of the PEX-A pipe in this example includes a PEX-A antibacterial layer 1, a PEX-A main body layer 2, and an anti-UV layer 3 sequentially from inside to outside, and the PEX-A antibacterial layer 1, the PEX-A main body layer 2, and the anti-UV layer 3 have a thickness ratio of 1:12:1. The PEX-A antibacterial layer 1 is attached to the PEX-A main body layer 2, and the PEX-A main body layer 2 is attached to the anti-UV layer 3.

Materials for the PEX-A antibacterial layer 1 are PEX-A and an antibacterial agent; a material for the PEX-A main body layer 2 is PEX-A; and materials for the anti-UV layer 3 are PE, an anti-UV additive, and an antioxidant.

Comparative Example 2

Figure 2:
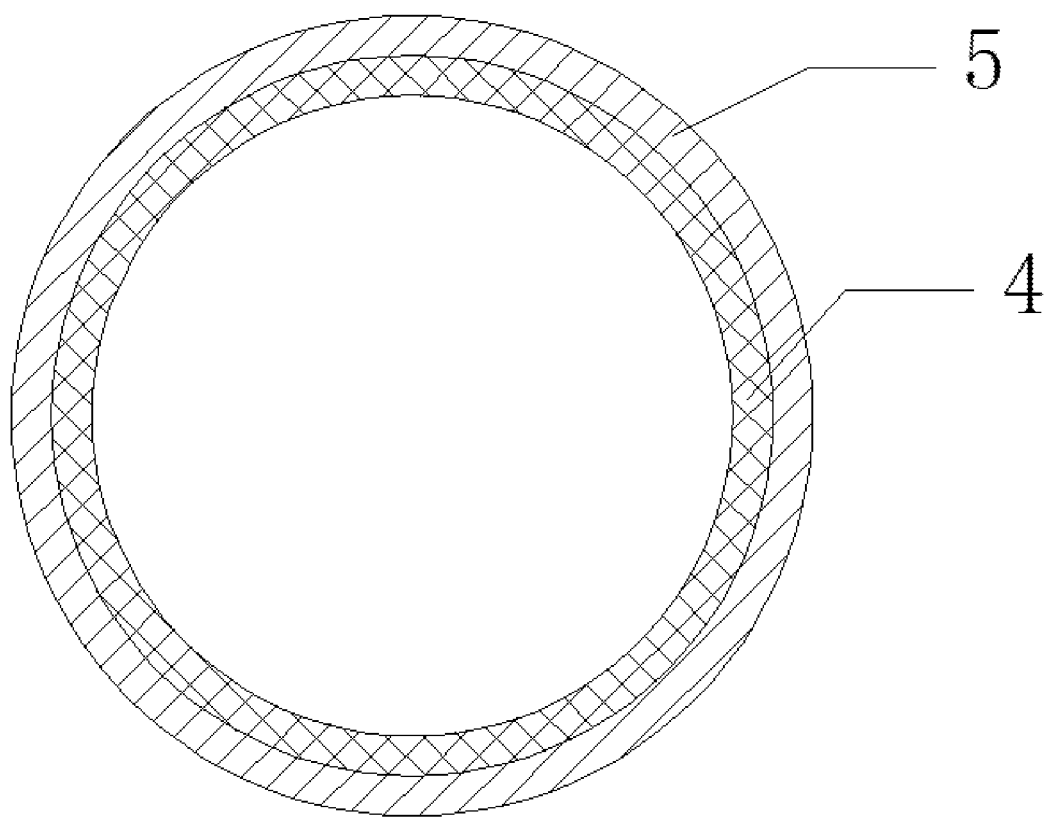
FIG. 2 is a schematic structural diagram for the PEX-A pipe of Comparative Example 1, where 4 denotes an antibacterial layer and 5 denotes a protective layer.

As shown in FIG. 2, the pipe wall of the PEX-A pipe in this comparative example includes an antibacterial layer 4 and a protective layer 5 sequentially from inside to outside, and the antibacterial layer 4 and the protective layer 5 are bonded together by a binder. Materials for the antibacterial layer 4 are PEX-A and an antibacterial agent, and materials for the protective layer 5 are PEX-A and an antioxidant. The antibacterial layer 4 and the protective layer 5 have a thickness ratio of 1:9.

The antibacterial performance and weather resistance of the PEX-A pipes obtained in the examples and comparative examples above were tested. The antibacterial rate, which was calculated using the experimental techniques provided in JC/T 939-2004, reflected the antibacterial performance. The elongation at break of the sample, which was measured using exposure cycles in accordance with GB/T 16422.3, reflected the weather resistance. Specific test results were shown in Table 1.

TABLE 1

| Group | Antibacterial rate | Elongation at break |
| --- | --- | --- |
| Example 1 | 99.99% | 395% |
| Example 2 | 99.99% | 529% |
| Example 3 | 99.99% | 476% |
| Comparative Example 1 | 99.0% | 466% |
| Comparative Example 2 | 99.9% | 320% |

It can be seen from the above results that the PEX-A antibacterial layer and the anti-UV layer could enhance both the antibacterial performance and the weather resistance of the PEX-A pipe. The PEX-A antibacterial layer could inhibit bacterial growth and reproduction in the water within the pipe. The anti-UV layer could enhance the weather resistance and aging resistance of the pipe, thus extending the service life of the pipe. In addition, by adjusting the thickness ratio of the PEX-A antibacterial layer, the PEX-A main body layer, and the anti-UV layer, the antibacterial performance and aging resistance of the pipe can be modified accordingly. In particular, when the PEX-A antibacterial layer, the PEX-A main body layer, and the anti-UV layer have a thickness ratio of (1-3):(9-11):(0.5-1), a resulting PEX-A pipe is ensured to have both prominent aging resistance and prominent antibacterial performance.

Finally, it should be noted that the above examples are provided merely to describe the technical solutions of the present disclosure, rather than to limit the protection scope of the present disclosure. Although the present disclosure is described in detail with reference to preferred examples, a person of ordinary skill in the art should understand that modifications or equivalent replacements may be made to the technical solutions of the present disclosure without departing from the spirit and scope of the technical solutions of the present disclosure.

The invention claimed is:

1. A cross-linked polyethylene type A (PEX-A) pipe, wherein a pipe wall of the PEX-A pipe comprises a PEX-A antibacterial layer (1), a PEX-A main body layer (2), and an anti-ultraviolet (UV) layer (3) from inside to outside, wherein the PEX-A antibacterial layer (1) is attached to the PEX-A main body layer (2), and the PEX-A main body layer (2) is attached to the anti-UV layer (3);

wherein the PEX-A antibacterial layer (1), the PEX-A main body layer (2), and the anti-UV layer (3) have a thickness ratio of (1-3):(9-11):(0.5-1).

2. The PEX-A pipe according to claim 1, wherein materials for the PEX-A antibacterial layer (1) are PEX-A and an antibacterial agent.

3. The PEX-A pipe according to claim 2, wherein materials for the anti-UV layer (3) are PE, an anti-UV additive, and an antioxidant.

4. The PEX-A pipe according to claim 1, wherein a material for the PEX-A main body layer (2) is PEX-A.

5. The PEX-A pipe according to claim 4, wherein materials for the anti-UV layer (3) are PE, an anti-UV additive, and an antioxidant.

6. The PEX-A pipe according to claim 1, wherein materials for the anti-UV layer (3) are PE, an anti-UV additive, and an antioxidant.

* * * * *